March 24, 1931. J. P. DOVEL 1,797,906
GAS CLEANER
Filed Feb. 2, 1928 2 Sheets-Sheet 1

Inventor
J. P. Dovel
By Johnston & Jennings
Attorneys

March 24, 1931. J. P. DOVEL 1,797,906
GAS CLEANER
Filed Feb. 2, 1928 2 Sheets-Sheet 2

Inventor
J. P. Dovel
By Johnston & Jennings
Attorneys

Patented Mar. 24, 1931

1,797,906

UNITED STATES PATENT OFFICE

JAMES PICKERING DOVEL, OF BIRMINGHAM, ALABAMA, ASSIGNOR TO G. P. DOVEL

GAS CLEANER

Application filed February 2, 1928. Serial No. 251,441.

My invention relates to gas cleaners such as are used in blast furnaces, more particularly to gas cleaners such as are described and claimed in Letters Patent No. 1,609,611, issued to me December 7, 1926, and has for its object the provision of apparatus for maintaining the interior of such a cleaner free from dust deposits whereby the cleaner may be operated for longer periods of time without necessity of shut downs for cleaning.

A further object of my invention is to provide means for the mechanical removal of dust from gas cleaning apparatus of the character designated whereby the necessity for shutting the apparatus down for manual cleaning is obviated.

A more specific object of my invention is to provide a scraper adapted to traverse the walls of a gas cleaner where the gas comes in contact with water and is liable to stick and form deposits, together with simple, effective means for operating the scraper.

While the apparatus described in my before mentioned patent has proved to be eminently successful and reliable in operation, I have found, especially with heavily dust laden gas, that where the gas strikes the edge of the water in the cleaning through or becomes damp and strikes the wall of the vessel in the vicinity of the cleaning trough, it has a tendency to stick to the walls of the vessel and collect other such particles. The particles of dust thus collected on the walls have such cementitous qualities that, unless loosened, there is a building up of such caked deposits on the walls until the apparatus must, at intervals, be shut down and manually cleaned.

I have found that the before mentioned deposits of caked material around a cleaning trough or water way, such as has just been described, may be prevented by scraping the walls of the cleaner at intervals along the water way, thus loosening the deposits and permitting them to be carried out by the water flow through the cleaner. To this end my invention comprises a scraper built up from a plurality of bars conformed to the shape of the water way and secured to a cable extending along the water way and through the end walls of the vessel. The cable has its two ends secured to a drum and means are provided for rotating the drum in opposite directions whereby the scraper may be pulled to and fro along the water way. By this apparatus, I am enabled to run a gas cleaner for a much longer interval of time without necessity of a shut down and manual loosening of the dust deposits.

Figure 1:
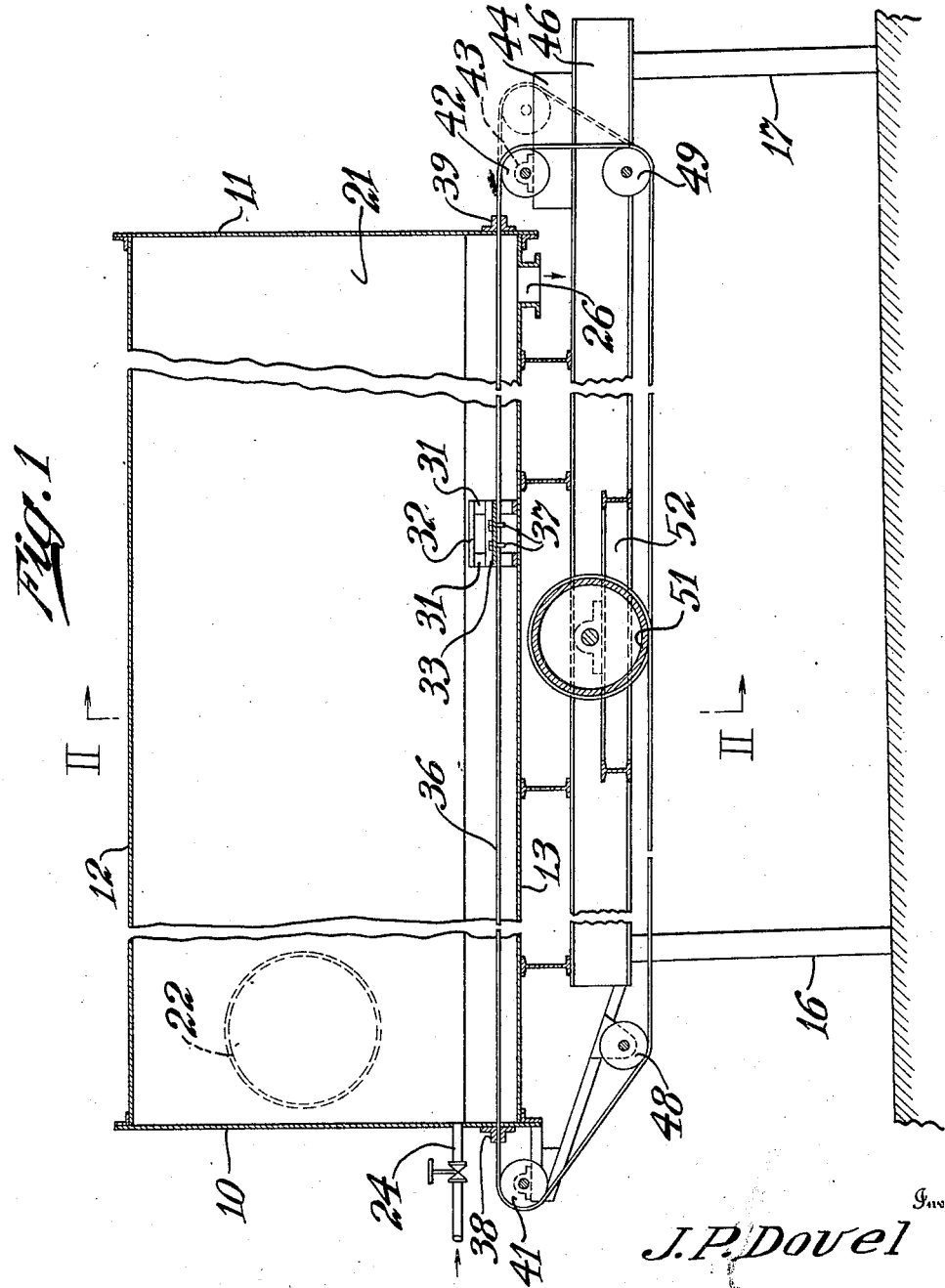
Figure 2:
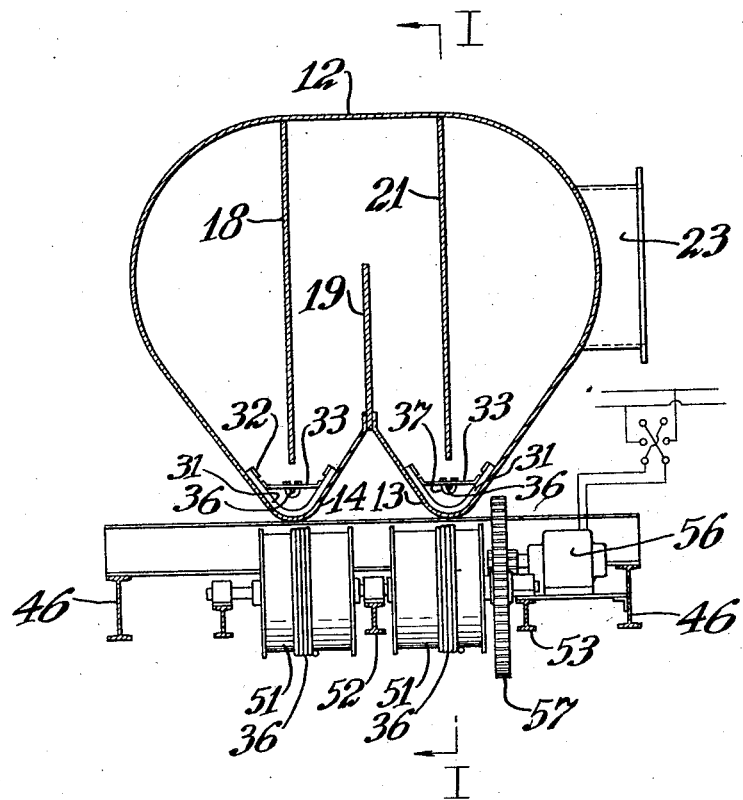

Apparatus embodying features of my invention is illustrated in the accompanying drawing, forming a part of this application, wherein Fig. 1 is a longitudinal sectional view taken along the line I—I of Fig. 2, and Fig. 2 is a transverse sectional view taken along the line II—II of Fig. 1.

Referring to the drawing, I show a gas cleaner comprising a vessel having end walls 10 and 11, an upper wall 12 and bottom V-shaped troughs or water ways 13 and 14. The enclosed vessel is mounted on supporting structure comprising end members 16 and 17, the end member 16 being higher than the end member 17 so that the vessel is slightly inclined from the horizontal. Within the enclosed vessel are provided baffles 18, 19 and 21, the baffles 18 and 21 extending downwardly from the upper wall 12 to a point above the troughs 13 and 14, and the baffle 19 extending upwardly from the bottom of the troughs 13 and 14. Gas to be cleaned is admitted to the vessel through an inlet 22 and passes downwardly under the baffle 18 over the trough 14, upwardly over the baffle 19, again downwardly under the baffle 21 across the trough 13 and then upwardly and out of the cleaner through an outlet 23. Water is admitted to the troughs 13 and 14 by any suitable means, such as a conduit 24, and runs by gravity to the opposite end of the cleaner from whence it is discharged through an outlet 26. The gas passing under the baffles 18 and 21 comes in contact with the water in the troughs 13 and 14 and, due to its change in direction and velocity under the baffles, throws the major portion of the dust therein against the surface of the water by centrifugal force and the dust is thereupon carried away by the water through the outlet 26.

The apparatus so far described is quite similar to that disclosed in my aforesaid Patent, No. 1,609,611. The means for preventing caky deposits of dust along the troughs or water ways 13 and 14 in apparatus of this character, which comprises my present invention, will now be described. Within each of the V-shaped water ways or troughs 13 and 14 is provided a scraper conforming in shape to the troughs and joined together to form a unitary structure by longitudinally extending members 32. Joined to the opposed upturned ends of the members 31 are transverse plate members 33. Extending from end to end of the enclosed vessel along each of the troughs 13 and 14 and outwardly through the end walls 10 and 11 is a cable 36. The cable 36 is secured to the plate member 33 by U clamps 37. Where the cable 36 extends through the end walls 10 and 11, I provide guides 38 and 39. At the inlet end of the vessel beyond the guide 38 is provided a sheave 41 over which the cable 36 runs. At the outlet end of the vessel, a movable sheave 42 is provided, the sheave 42 being journaled in bearings 43 supported by a member 44 slidably mounted upon a structural member 46, the latter being supported by the structural members 16 and 17. The opposed ends of the cable 36 are brought around the sheaves 41 and 42 and under two other sheaves 48 and 49 to a drum 51 mounted upon longitudinally extending structural members 52 and 53 arranged beneath the cleaning vessel. The ends of the cable 36 are brought around the drum 51 and secured thereto so that, as the drum 51 is rotated, one end of the cable 36 is wound onto the drum while the other end is paid off. It will be seen that, in this manner, the scraper may be pulled from one end to the other of the enclosed vessel along its associated water way, depending upon the direction of rotation of the drum 51. The drum 51 is driven by means of a reversible motor 56 through a gear train 57.

From the foregoing description, the operation of apparatus made in accordance with my invention will be apparent. As the gas is cleaned by surface contact with the water in the troughs 13 and 14 and dust deposits tend to cake along the sides of the troughs or water ways, the drums 51 are rotated by means of the motor 56 to drag the scraper from end to end of the vessel. The action described need only occur at intervals in order to keep the walls of the vessel clear. As the material is loosened from the walls it is carried toward the lower end of the vessel by the water flow and runs by gravity outwardly through the outlet 26 to suitable disposal means, not shown. The scraper being made up of bars bent to conform to the shape of the trough does not seriously interfere with the water flow wherever it happens to be along the vessel, though preferably it is kept at the upper or inlet end of the vessel during the intervals when it is not being reciprocated. By adjustment of the slidably mounted member 44, the cable 36 is kept taut and is in no danger of fouling.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

In a gas cleaner embodying an enclosed vessel having a water trough in the bottom thereof for surface contact cleaning of the gas, a reciprocable scraper for loosening dust deposits comprising a plurality of spaced transversely extending structural bars having their ends bent upwards to conform to the shape of the trough, members extending longitudinally of the trough for securing the bars together to form a unitary structure, transverse members joined to the upturned portions of the bar, a cable for reciprocating the scraper and extending along the trough and through the end walls of the vessel, means securing the cable to the transverse members, and means for discharging water and loosened material from the bottom of the vessel.

In testimony whereof I JAMES P. DOVEL, affix my signature.

JAMES PICKERING DOVEL.